United States Patent [19]

Carvey et al.

[11] Patent Number: 5,734,649
[45] Date of Patent: Mar. 31, 1998

[54] DATA PACKET ROUTER

[75] Inventors: Philip P. Carvey, Bedford; Thomas F. Clarke, Cambridge, both of Mass.

[73] Assignee: BBN Corporation, Cambridge, Mass.

[21] Appl. No.: 656,546

[22] Filed: May 31, 1996

[51] Int. Cl.$^6$ .................................................. H04L 12/56
[52] U.S. Cl. ........................... 370/355; 370/389; 370/461
[58] Field of Search ................................... 370/396, 388, 370/395, 409, 411, 413, 351, 352, 355, 250, 389, 461, 462; 340/825.06, 825.07, 825.08, 825.03

[56] References Cited

U.S. PATENT DOCUMENTS

| | | | |
|---|---|---|---|
| 4,817,084 | 3/1989 | Arthurs et al. | 370/411 |
| 5,107,489 | 4/1992 | Brown et al. | 340/825.15 |
| 5,132,965 | 7/1992 | Zhang | 370/411 |
| 5,216,668 | 6/1993 | Zhang | 370/411 |
| 5,299,190 | 3/1994 | LaMaire et al. | 370/413 |

OTHER PUBLICATIONS

Yuval Tamir and Hsin-Chou Chi—"Symmetric Crossbar Arbiters For VLSI Communication Switches" —IEEE Transactions On Parallel and Distributed Systems, vol. 4, No. 1, 1993, pp. 13–27.

Richard O. LaMaire and Dimitrios N. Serpanos—"Two-Dimensional Round-Robin Schedulers For Packet Switches With Multiple Input Queues—IEEE/ACM Transactions On Networking", vol. 2, No. 5, Oct. 1994, pp. 471–482.

*Primary Examiner*—Douglas W. Olms
*Assistant Examiner*—Ajit Patel
*Attorney, Agent, or Firm*—Henry D. Pahl, Jr.

[57] ABSTRACT

In the data packet router disclosed herein, a matrix of crosspoint switch elements connects data sources to selected destinations during each of a succession of intervals. Allocation of switch elements to desired connections is accomplished by a process which provides a data array having a number of data elements corresponding to the number of switch elements. During each interval, a source is assigned to each of the data elements in accordance with a first current pseudo-random shuffle pattern and a respective destination is assigned to each of the data elements in accordance with a second current pseudo-random shuffle pattern. A new set of shuffle patterns is generated during each interval. An incremental testing is performed across the data array to locate matches not previously allocated and each match found is successively allocated to this switch element corresponding to the data element. After testing, the complete array of switch elements are operated, during a subsequent interval, in accordance with the previously determined allocations.

16 Claims, 7 Drawing Sheets

| 1 | 2 | 3 | 4 | 5 | 6 |
|---|---|---|---|---|---|
| 2 | 3 | 4 | 5 | 6 | 7 |
| 3 | 4 | 5 | 6 | 7 | 8 |
| 4 | 5 | 6 | 7 | 8 | 9 |
| 5 | 6 | 7 | 8 | 9 | 10 |
| 6 | 7 | 8 | 9 | 10 | 11 |

*FIG. 3*

| 1 | 2 | 3 | 4 | 5 | 6 |
|---|---|---|---|---|---|
| 7 | 8 | 9 | 10 | 11 | 12 |
| 13 | 14 | 15 | 16 | 17 | 18 |
| 19 | 20 | 21 | 22 | 23 | 24 |
| 25 | 26 | 27 | 28 | 29 | 30 |
| 31 | 32 | 33 | 34 | 35 | 36 |

| 1 | 1 | 2 | 2 | 3 | 3 | 4 | 4 | | | | |
|---|---|---|---|---|---|---|---|---|---|---|---|
| 1 | 1 | 2 | 2 | 3 | 3 | 4 | 4 | | | | |
| 2 | 2 | 3 | 3 | 4 | 4 | | | | | | |
| 2 | 2 | 3 | 3 | 4 | 4 | | | | | | |
| 3 | 3 | 4 | 4 | | | | | | | | |
| 3 | 3 | 4 | 4 | | | | | | | | |
| 4 | 4 | | | | | | | | | | |
| 4 | 4 | | | | | | | | | | |
| | | | | | | | | | | | |
| | | | | | | | | | | | |
| | | | | | | | | | | | |
| | | | | | | | | | | | |

FIG. 8

DATA PACKET ROUTER

BACKGROUND OF THE INVENTION

The present invention relates generally to packet switched data handling systems and, more particularly, to a high speed router employing a crossbar type switch controlled in a manner which can very rapidly and efficiently allocate available connection points.

There is increasing interest in providing communications between disparate computer systems and even between networks of differing characteristics. Further, with the availability of very high bandwidth trunk lines, e.g., using fiber optic cables, there is increasing interest in combining traffic from a great variety of sources for transmission through a single trunk line. For wide area networks, packet switching technology is widely used where information to be transmitted is broken into packets of data which are preceded by headers containing information useful in routing. The header may also identify the source and the destination. Whether truly packet switched or not, most digital communication systems employ message formats in which there is an identifying header of some sort.

As is well known, data network usage is expanding at a great rate both in terms of private networks and also public networks such as the Internet. While transmission link bandwidths keep improving, the technology of the systems which connect the links has lagged behind. In particular, routers are needed which can keep up with the higher transmission link bandwidths. A high speed router needs to achieve three goals. First, it needs to have enough internal bandwidth to move packets between its input and output interfaces at the desired rates. Second, it needs enough packet processing power at the interfaces to forward the packets and, third, the router needs to be able to redirect the packets between possible paths at the requisite rates.

Most currently available or conventional routers are bus based, that is, a high speed bus is provided which can link a single input to a single output at one time. The router of the present invention utilizes a crossbar switch type interconnection scheme between inputs and outputs. While crossbar-type interconnection schemes have been utilized heretofore in various contexts, one problem which exists in the context of packet switching is the allocation of available paths through the crossbar. As is understood by those skilled in the art, only a limited number of switch points can be utilized at any one time since a single input should not be connected to more than one output at a given time and, likewise, each output should only be connected to a single input.

In order to provide maximum efficiency and throughput, the system for allocating crossbar connection points has to operate at very high speed in determining which of competing possibilities will be accommodated. Further, the system must be fair in the sense it does not overly favor one source over another or one form of data communication over another. Given that very disparate patterns can exist in data communication demands, particularly when accommodating data originating from disparate systems, the allocation problem is not a simple one.

Among the several objects of the present invention may be noted the provision of a data router for connecting, to a plurality of data destinations, a plurality of data sources bidding for connection to identified ones of the destinations; the provision of such a router which uses a matrix of crosspoint switch elements; the provision of such a router which establishes sets of connections during each of the succession of intervals; the provision of such a router which treats competing sources fairly; the provision of such a router which operates at high speed; the provision of such a router which makes efficient use of the transmission link bandwidths connected to it; the provision of such a router which is highly reliable and which is of relatively simple and inexpensive construction. Other objects and features will be in part apparent and in part pointed out hereinafter.

SUMMARY OF THE INVENTION

The router of the present invention operates by connecting, to a plurality of data destinations, a plurality of data sources which are bidding for connection to identified ones of those destinations, the connections being made during each of a succession of intervals using a matrix of crosspoint switch elements. The switch elements are allocated by a process which provides, in correspondence with the switch element matrix, a data array having a number of data elements corresponding to a number of switch elements. During each interval, current first and second pseudo-random shuffle patterns are generated. A respective source is assigned to each of the data elements in accordance with the first current pseudo-random shuffle pattern and a respective destination is assigned to each of the data elements in accordance with the second current pseudo-random shuffle pattern. An incremental testing is performed across the array of the sources and destinations assigned to each region to locate matches of bidding sources and destinations not previously allocated. Each match found is successively allocated to the switch element corresponding to the respective data element. After testing the complete array, the switch elements are operated during a subsequent interval in accordance with the allocations. In the following description, these successive intervals are frequently referred to as "epochs" during which successive stages of the allocation process are performed in overlapping or pipelined manner.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
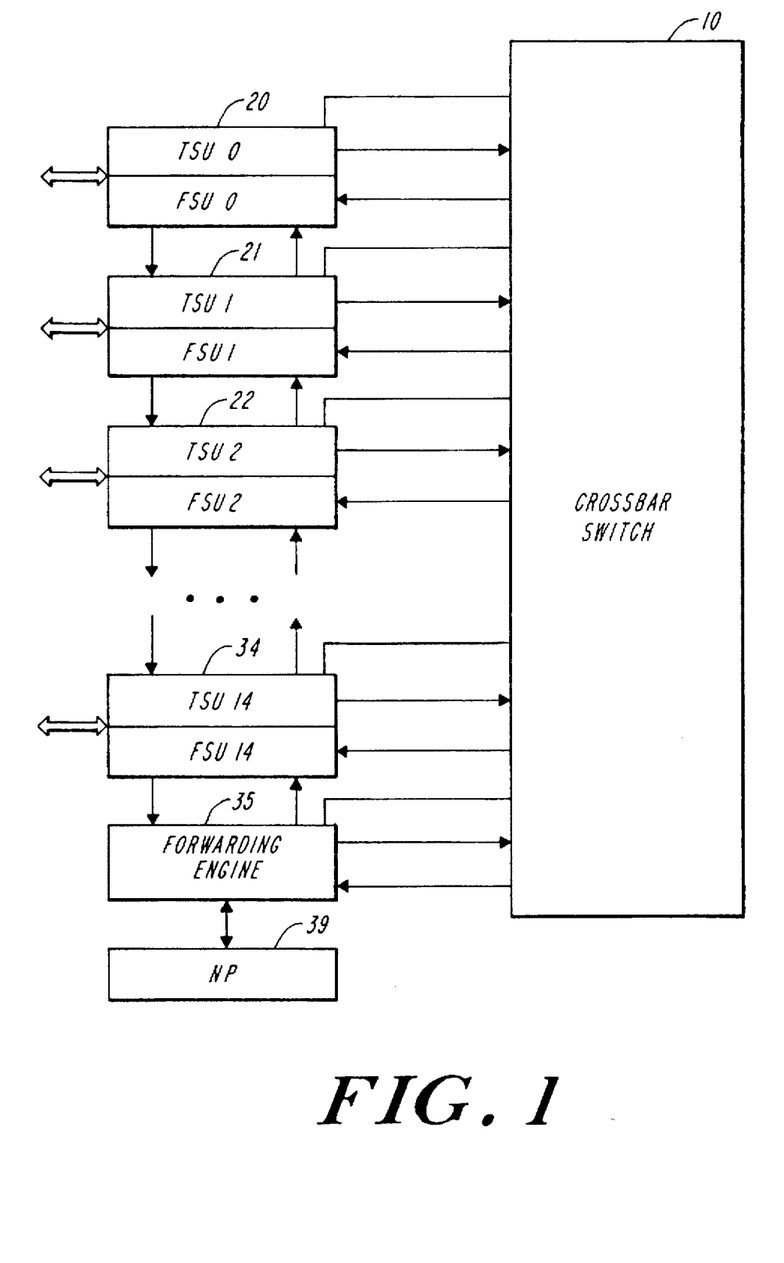
FIG. 1 is a block diagram of a data packet router in accordance with the present invention.

Referring now to FIG. 1 which illustrates the overall arrangement of a router according to the present invention, it can be seen that a crossbar switch, designated by reference character 10, interconnects a plurality of function cards, designated by reference characters 20–35. Fifteen of these function cards 20–34 provide high speed bi-directional ports to the router system while the last function card 35 is a so-called forwarding engine whose functioning is described hereinafter. Each of the port cards 20–34 can be considered as comprising both a to-switch-unit (TSU) and a from-switch-unit (FSU). In general, it is the function of the crossbar switch 10 to be able to connect any to-switch-unit (TSU) to any from-switch-unit (FSU) and to similarly connect the input and output data paths on the forwarding engine 35.

The router also includes a network processor 39. As in other conventional routers, the network processor 39 is a general purpose programmed computer whose function is to manage the overall operation of the router in cooperation with other components of the network of which the router is a part, such as other routers, gateways and the transmission links themselves. The network processor 39 can itself send packets and receive packets across the network through the forwarding engine 35.

The present invention is not particularly involved with the operation of the network processor 39 except that it should be noted that the network processor generates and loads, into the forwarding engine 35, routing tables which define the correspondence between network packet addresses and the resultant necessary connections through the crossbar switch 10.

The principal purpose of the forwarding engine 35 is to read the headers of packets coming into a TSU from the outside world, i.e. the network, to update the header for transmission out of the router, and to provide to the respective TSU a data structure which identifies the output port to which the packets should be transmitted through the crossbar switch 10. The forwarding engine may also break up packets arriving from the network, which packets may be of varying size, into standard sized packets or cells which are transported through the crossbar switch itself and then reassembled at the respective FSU. The elements of the data structure given to the TSU may be considered as "bids", each of which identifies a data cell seeking to utilize a particular crossbar switch point. This is in one sense a simple set of tasks but is demanding in terms of speed and is preferably performed by a high speed microcomputer. In the preferred embodiment of the present invention, the forwarding engine employs an Alpha 21164 processor manufactured by the Digital Equipment Corporation of Maynard, Mass. For larger systems, multiple forwarding engines may be utilized.

Figure 2:
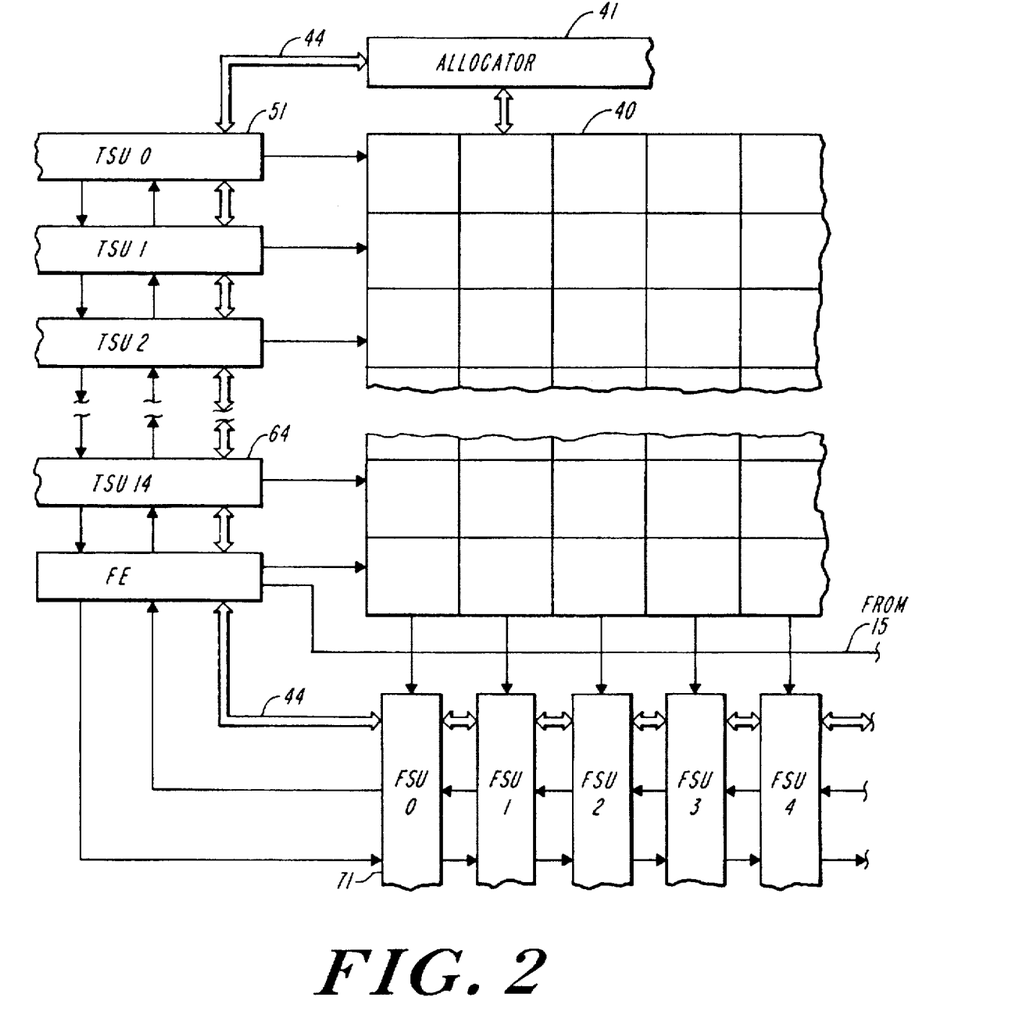
FIG. 2 is a block diagram of a portion of the router of FIG. 1 showing in greater detail the crossbar switch employed therein.

In accordance with one aspect of the present invention, each to-switch-unit (TSU) provides a queue of bids for each output path in the crossbar switch, i.e. sixteen queues in all. The data cells themselves are preferably held as a linked list in random access memory. In FIG. 2, the illustration of the crossbar switch has been expanded to represent the individual crosspoint connections as an array 40 of crosspoint elements with the allocator which actuates the crosspoint switch elements as a separate component, designated by reference character 41. Likewise, the inputs and outputs to the switch matrix have been rearranged so that the inputs are along one axis, the left side of the array and the output paths are along the other axis, i.e. the bottom of the array.

In accordance with the preferred practice of the present invention, each of the from-switch-units (FSUs) also contain a queue for cells received from each of the input pathways.

In other words, each FSU comprises at least 15 queues. These queues are utilized in the management of the router as described in greater detail hereinafter.

The allocator 41, the TSUs and the FSUs are linked by control lines 44 which are employed in the coordination of operations as described in greater detail hereinafter. Among other signals, these lines carry switch messages which are of four types. The content of all Switch messages is in general always the same, a four-bit Port number. Ports are numbered from 1 to 15. Message 0000 is reserved as a no-op code. Because there are dedicated Switch message signals for each Port, every message really implies two Port numbers—the number of the Port that sent the message and the Port number encoded in the message proper. This pairing of Port numbers is at the heart of all Switch operations.

There are four Switch message types and each Port has dedicated signals for each type.
1. Request message—A Port's TSU sends this message to the Switch to request data transfer to the FSU of the encoded Port number.
2. Destination message—The Switch sends this message to the TSU of a Port to indicate that the TSU should begin data transfer to the encoded FSU Port number.
3. Release message—A Port's FSU sends this message to the Switch to indicate that it has freed a buffer for the encoded Port number.
4. Source message—The Switch sends this message to the FSU of a Port to indicate that data transfer from the encoded Port number is about to commence.

As indicated previously, the function of the allocator 41 is to actuate, during each interval or epoch, a combination of switch point elements which will pass cells from sources having data for transmission to identified ones of the destinations. To this end, the TSUs and the allocator implement a token passing scheme which allows the allocator to know which TSUs have one or more bids for each crossbar switch point. In the preferred embodiment, the allocator employs, for each switch point, a counter providing four states. Thus, each TSU can have up to three bids pending for each output port. At start up, the counters are initially set to zero. When a bid is transmitted by the TSU to the allocator, the respective counter is incremented. Conversely, when the allocator accepts, for the respective switch point, a cell from the corresponding TSU, the counter is decremented. Each counter thus effectively implements a bid queue. The TSU also uses these events to track the state of the counter in the allocator so that it does not attempt to have more than three bids pending in the allocator for any one output port.

An essentially similar token passing scheme is provided between the FSUs and the allocator in which the tokens represent output buffers available to accept data cells from the corresponding switch point. Again, a four state counter is provided in the allocator for tracking the number of output buffers available, up to three.

In this regard, it should be noted that the allocator operated essentially as a slave device whose operation is controlled by the TSUs. As is understood, this is advantageous in facilitating a relatively simple, high speed implementation.

A significant advantage of providing, for each input port, a bid queue for each output port, is that head-of-queue blocking is virtually eliminated. Head-of-queue blocking is a well recognized problem in conventional routers.

In accordance with an important aspect of the present invention, the allocator 41 does not merely examine the pending bids for each switch point individually or sequentially but, rather, implements a procedure possessing a high degree of parallelism so that multiple cells can be tested simultaneously to see if there are pending requests which could utilize that point. As described in greater detail hereinafter, the procedure also enforces a selectable degree of "fairness" in the allocation.

In one sense, the process utilized by the allocators starts at one corner of a data array corresponding to the points in the switch matrix, e.g. location 0,0, and determines if this point can be used. If it can be used, the point is tagged as being allocated. The process then increments along both axes, i.e. to cells 0,1 , and 1,0. These points can be used if the 0,0 point has not been allocated. This conforms with the understanding expressed previously that each source can be connected only to one destination and each destination can be connected to only one source. Similarly, depending upon whether positions 0,1 or 1,0 have been utilized, the allocator can test to determine if there are bids for the positions 0,2, 1,1 and 2,0. In one sense, this can be considered as advancing along both axes from each of the just previously tested positions. This can be considered a highly parallel systolic process with the processing proceeding perpendicular to the direction of dependency, in this case the dependency of each new allocation upon the allocations which have been made previously. Stated another way, all of the prerequisite upstream tests have been performed prior to reaching any of the newly considered points.

Figure 3:
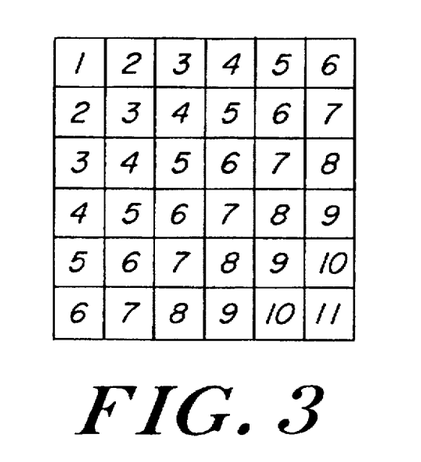
FIG. 3 is a diagram, in simplified form, of a data array utilized in the allocation of switch points in the router of FIGS. 1 and 2.
Figure 4:
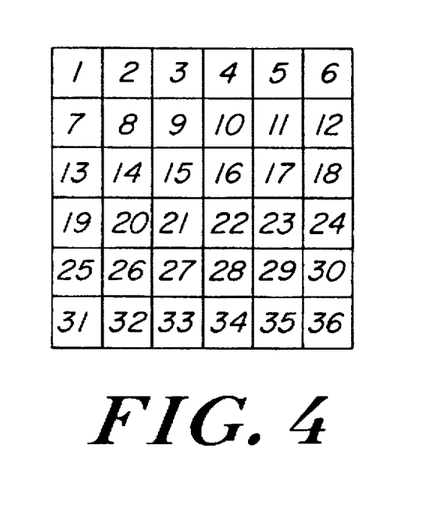
FIG. 4 is a diagram of an alternate, less efficient data array.

For the purpose of illustration, a 6×6 array is shown in FIG. 3 and the sequence in which the points are tested is indicated by the numbers in the points. As may be seen, only one point is tested at the first stage but the number of points tested at each stage increases to a maximum of six at stage six and then decreases back to one. Further, the testing of the various points along the diagonal which forms one stage can be performed simultaneously on all the points since the decision on each cell does not depend on the other points in the diagonal. This may be likened to a "wavefront" traversing the array. Thus, while it is not uniform, there is a substantial degree of parallelism in the processing, e.g. as compared with a straightforward sequential pattern as illustrated in FIG. 4. This parallelism speeds the overall computation as is understood by those skilled in the art. The testing process itself can be implemented in either dedicated state machine logic or by means of programmed microcomputers.

Figure 5:
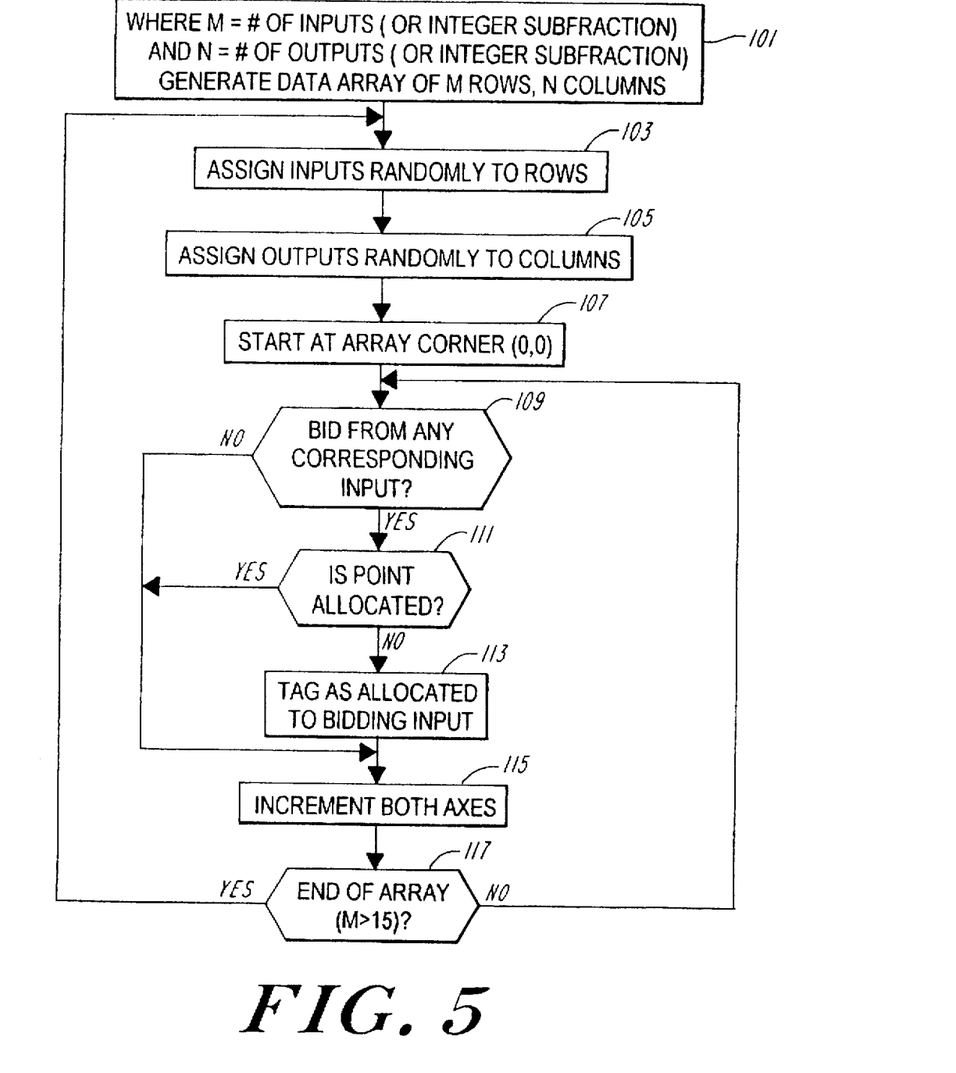
FIG. 5 is a flowchart illustrating the operation of an allocator employed in the crossbar switch of FIG. 2.

If, however, the data array just described had a fixed one-to-one relationship with switch elements in the actual crosspoint switch matrix, the procedure would highly favor the initially tested elements since they would always get first crack at being chosen. To avoid this possible favoring of some inputs over others, the actual procedure used in the practice of the present invention employs a constantly shifting assignment of inputs to rows in the array and likewise a constantly shifting assignment of outputs to columns in the array. Further, these assignments are preferably random so that even subtle patterns in the presentation of data to the system will not engender unfairness. Though it is not intuitive or obvious, the scrambling or shuffling of inputs and outputs with respect to corresponding elements of the data matrix does not defeat the dependency criteria, i.e. that more than one input cannot be connected to a given output and vice versa. The overall process is illustrated in FIG. 5.

As a first step, designated by reference character 101, a data array is generated of M rows and N columns where M equals the number of inputs and N equals the number of outputs. Inputs are randomly assigned to rows, as indicated at block 103, while outputs are randomly assigned to columns, as indicated at block 105.

Starting at an array corner, e.g. (0,0) as indicated at block 107, points are tested to determine if there is a bid from any input corresponding to that point. This is indicated by reference character 109. If there is an applicable bid, it is then determined, as indicated at test 111, whether the point is allocated or barred by earlier allocations. If the point has not been previously allocated, it is tagged as allocated to the bidding input as indicated at block 113. If the test at block 109 indicates that there was no bid from the corresponding input or if the point was previously allocated as tested at block 11, the processing jumps forward past step 113. As indicated previously, the steps indicated at blocks 109, 111 and 113 can be performed in parallel on all array elements along the same diagonal, as illustrated in FIG. 3.

After testing the currently available set of cells, locations are incremented on both axes, as indicated at block 115, so as to move to the next diagonal as illustrated in FIG. 3. If the end of the array has not been reached, as tested at block 117, the cells in the next diagonal are tested (block 109) to see if there were bids from corresponding inputs. Once the end of the array is reached, the allocation process itself is complete. As indicated previously, the process of determining allocations occurs during a first epoch. During the next epoch, the switch elements which correspond to the allocated array cells will be actuated by the allocator in correspondence with the allocation performed during the previous epoch while, simultaneously, a new set of allocations will be initiated based upon a new random association of inputs to rows and outputs to columns.

Figure 6:
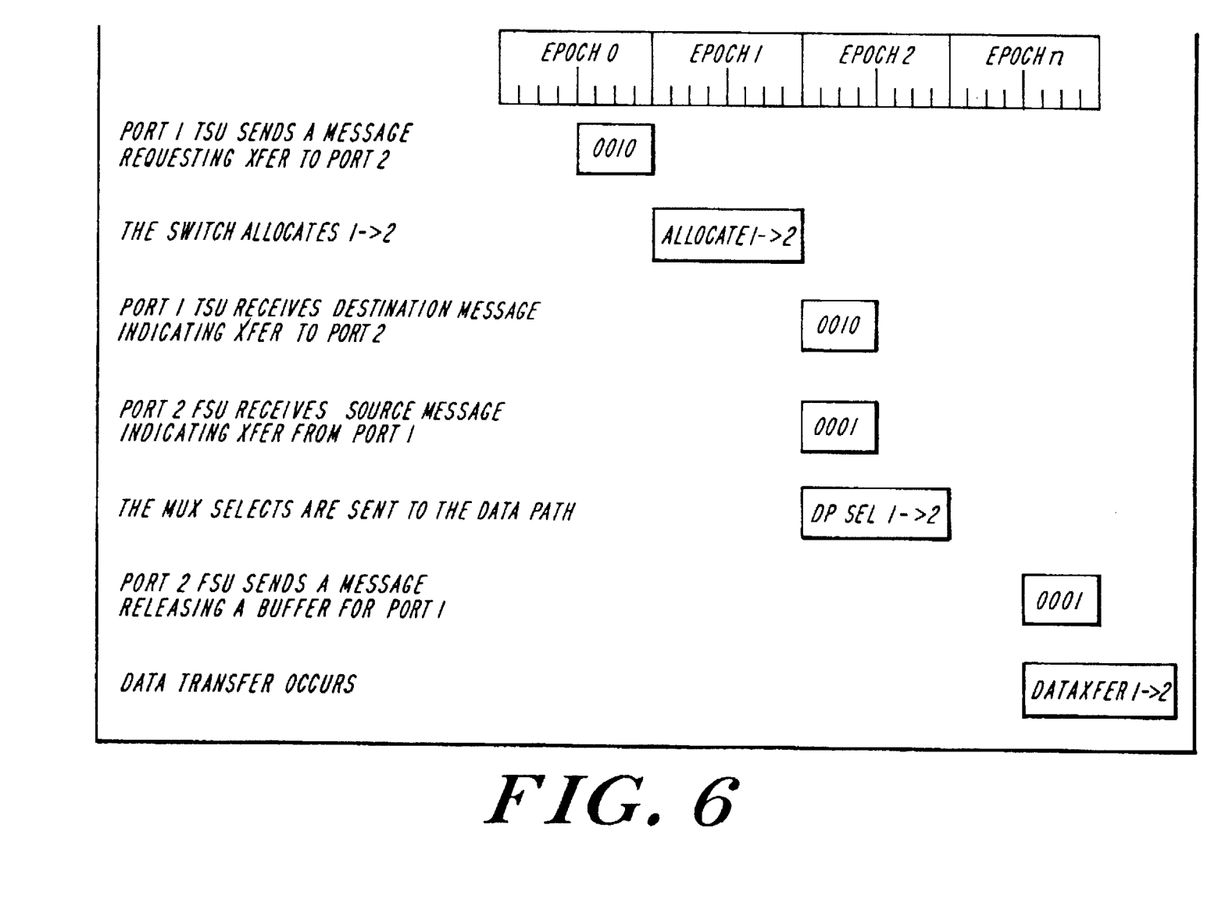
FIG. 6 is a timing diagram illustrating the operation of the allocator of FIGS. 1 and 2.
Figure 7:
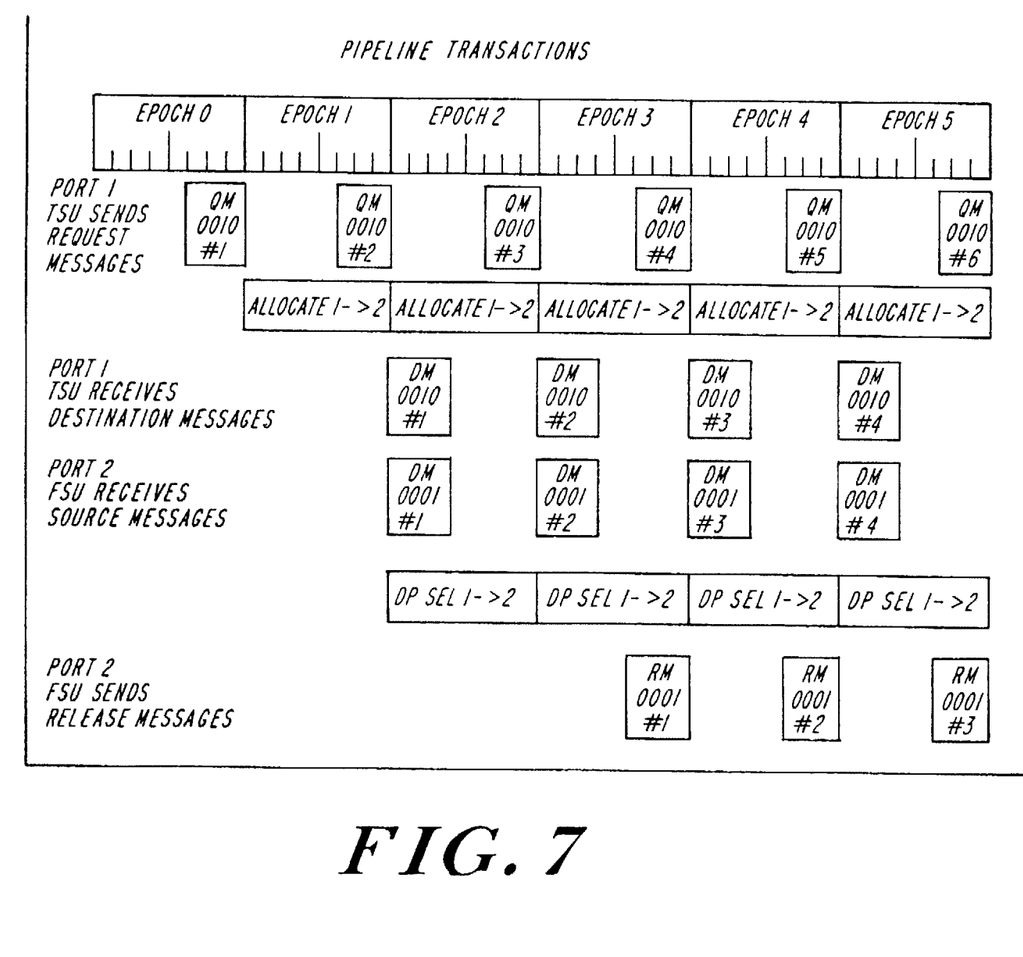
FIG. 7 is a timing diagram, similar to FIG. 6 but illustrating the transfer of multiple successive data cells through the same crossbar switch point.
Figure 8:
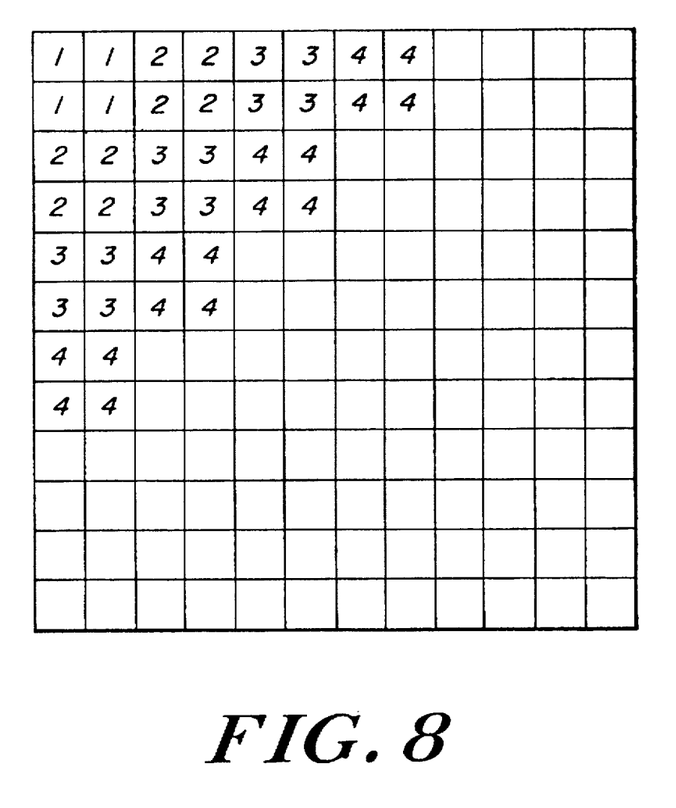
FIG. 8 illustrates the data array employed in an alternate embodiment of the allocation process.

The timing and relative overlap of the various processes involved in transmitting a data cell from one port to another, including allocation and actuation of switch points, is illustrated in FIG. 6. For example, during a first epoch, designated epoch φ, the TSU for port 1 sends a message requesting a transfer to port 2. During the next epoch, epoch 1, the allocator allocates a crossbar switchpoint which will connect port 1 to port 2 in accordance with the procedure illustrated in FIG. 3. During the next epoch, epoch 2, the port 1 TSU receives a destination message indicating it can transfer to port 2; the port 2 FSU receives a source message indicating transfer will proceed from port 1; and multiplexer select signals are sent to establish the appropriate data paths. During subsequent epochs, the crossbar switchpoint allocated is actually activated; port 2 FSU sends a message releasing a buffer for port 1 and the data transfer occurs. As will be understood, a succession of epochs can be used for successive cells through the same connection if this is desirable rather than providing the selection process for each cell individually. This is illustrated in FIG. 7.

Though a single transaction takes four Epochs, it is important to note that every Port can initiate a new transaction every Epoch. The 3-Epoch latency incurred by each transaction is masked by allowing each TSU to queue up to three Requests per Destination and allowing each FSU to queue up to three available buffers per Source. This allows transactions to be processed in pipeline fashion, which, in the steady state, results in 100% Switch bandwidth utilization. This is shown in the diagram below.

In accordance with a preferred aspect of the present invention, the shuffling or random assigning of inputs to rows in the data array and, similarly, the random assigning of outputs to columns is performed by a simple table lookup procedure using a table which is filled with previously calculated pseudo-random assignment patterns. As this is understood, using a table lookup allows for a very fast determination of a new assignment pattern consistent with the desire to have the router operate at very high speeds. In actual practice, it has been found unnecessary to provide a table of a size to accommodate all possible permutations of assignment patterns but, rather, a table having a number of entries equal to about 1/16 of the maximum is entirely adequate.

A further advantage of using a pre-calculated table is that it easily facilitates a hierarchical prioritizing of input ports. To achieve a prioritizing, it is merely necessary to break the data array up into groupings of elements, with the groupings having different spacings from the starting point (0,0) which distances correspond to their priority. Accordingly, high priority input ports can be assigned to the portion of the data array close to the starting point of the testing algorithm and these inputs, though randomized among themselves, will have the highest likelihood of achieveing a connection through the switch matrix. As will be understood by those skilled in the art, various mixed methods of biasing the pre-calculated table can also be devised to insure that there is no absolute priority amongst inputs but, rather, only an increase in statistical likelihood. As will be appreciated, the operation of the forwarding engine 35 (or the multiple forwarding engines in a larger system) is critical to proper operation of the overall system and thus its input port will typically be given highest priority.

It should be noted that the prioritizing which can be effected by biasing the pseudo-random shuffle table is a statistical prioritiziing of input ports, not a prioritizing of messages. If it is desired to prioritize among messages received at the same port, this can be implemented by employing parallel crossbar switch matrices. For example, in the preferred embodiment, a second 16×16 crossbar switch matrix could be provided in parallel with the matrix 40 of FIG. 2 and each TSU could bid high priority messages to the second matrix and lower priority messages to the first matrix.

While the algorithm illustrated in FIG. 5 which effects processing along diagonals of the data array provides a high degree of parallelism, it may, in certain instances, not be necessary to fully utilize the full extent of parallelism available. A substantial degree of parallelism can be effectively obtained by applying the same procedure to subgroups of array elements so that the process initially determines whether there is any bid at all pertaining to the subgroup and then arbitrates within the subgroup. This procedure is illustrated, again in simplified form, in FIG. 7. Considering the data array of FIG. 7 as representing a 12×12 crossbar switch, the switch elements are grouped into 2×2 subgroups. The subgroups are then tested in accordance with the same process as illustrated in FIG. 3 to determine if any of the elements in the subgroup correspond to a bidding source. If one or more of the elements are being bid for, then an arbitration, which can be a simple linear or progressive evaluation, determines which of the elements can be allocated and then tags those allocated as described previously.

As described thus far, the operation of the router is highly efficient and fair in unloading the buffers of the various sources attempting to pass data cells across the crossbar switch. There is, however, another form of congestion which can affect the efficient operation of a router and that is congestion in the outgoing buffers or queues. In accordance with another aspect of the present invention, the router of the present invention deals with such a situation by effectively circumventing the fairness of the allocation process employed by the switch system itself. This circumventing is effected by allowing each output port to communicate with each input port and to tell that input port to stop requesting from the alloactor access to the switch element which connects to the respective FSU output port.

As indicated previously, each output port maintains a separate queue or buffer for each possible input port. When the memory utilized by that queue exceeds a preselected level, the FSU sends, through the forwarding engine without going through the switch matrix, a control signal which causes the offending TSU to stop accepting packets from the originating source. In this way, an effective throttling is placed on the sources prior to its loading up the TSU bid queue which is making demands on the crossbar switch.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In a router for connecting, to a plurality of data destinations, a plurality of data sources bidding for connection to identified ones of said destinations, respective sets of connections being made during each of a succession of intervals using a matrix of crosspoint switch elements; a process for allocating the switch elements to possible connections which comprises:

providing, in correspondence with said switch element matrix, a data array having a number of data elements corresponding to the number of said switch elements;

generating for each interval, first and second pseudo-random shuffle patterns, the respective shuffle patterns generated for each interval being the current shuffle patterns for the respective interval;

assigning, in accordance with said first current pseudo-random shuffle pattern, a respective source to each of said data elements;

assigning, in accordance with said second current pseudo-random shuffle pattern, a respective destination to each of said data elements;

performing an incremental testing across the array, of the sources and destinations assigned to each data element to locate matches of bidding sources and destinations not previously allocated and successively allocating each match to the switch element corresponding to the respective data element; and after testing the complete array, operating the switch elements during a subsequent interval in accordance with the allocations made.

2. A process as set forth in claim 1 wherein, for each source, a respective bid queue is maintained for each destination.

3. A process as set forth in claim 2 wherein a data cell can be transmitted during each interval and wherein said bid queues are at least three cells long.

4. A process as set forth in claim 2 wherein each destination maintains an output buffer for each source and wherein each destination can disable waiting messages in the queue of a source for which the destination's respective output buffer has reached a preselected capacity.

5. A process as set forth in claim 1 wherein a source communicates bids to said process during a first one of said intervals; wherein said allocations occur during a second one of said intervals; wherein the allocation is communicated to the allocated sources and destinations are during a third one of said intervals; and wherein data transfer between correspondingly allocated sources and destinations occurs during a forth interval.

6. A process as set forth in claim 5 wherein each source maintains a bid queue for each destination and wherein said queues are at least three elements long so that it is possible for a source to transfer data cells during consecutive intervals.

7. In a router for connecting, to a plurality of data destinations, a plurality of data sources bidding for connection to identified ones of said destinations, respective sets of connections being made during each of a succession of intervals using a matrix of crosspoint switch elements, said sources including sources of at least first and second priority levels, said first priority level being of higher priority than the second, a process for allocating the switch elements to possible connections which comprises:

providing, in correspondence with said switch element matrix, a data array having a number of data elements corresponding to the number of said switch elements;

generating for each interval, first and second pseudo-random shuffle patterns, the respective shuffle patterns generated for each interval being the current shuffle patterns for the respective interval;

assigning, in accordance with said first current pseudo-random shuffle pattern, a respective source to each of said data elements;

assigning, in accordance with said second current pseudo-random shuffle pattern, a respective destination to each of said data elements;

performing an incremental testing across the array, of the sources and destinations assigned to each data element to locate matches of bidding sources and destinations not previously allocated and successively allocating each match to the switch element corresponding to the respective data element, said first shuffle pattern being biased to place sources of said first priority level closer to the start of said incremental testing; and after testing the complete array, operating the switch elements during a subsequent interval in accordance with the allocations made.

8. A process as set forth in claim 7 wherein a source communicates bids to said process during a first one of said intervals; wherein said allocations occur during a second one of said intervals; wherein the allocation is communicated to the allocated sources and destinations are during a third one of said intervals; and wherein data transfer between correspondingly allocated sources and destinations occurs during a forth interval.

9. A process as set forth in claim 8 wherein each source maintains a bid queue for each destination and wherein said queues are at least three elements long so that it is possible for a source to transfer data cells during consecutive intervals.

10. In a router for connecting, to a plurality of data destinations, a plurality of data sources bidding for connection to identified ones of said destinations, respective sets of connections being made during each of a succession of intervals using a matrix of crosspoint switch elements; a process for allocating the switch elements to possible connections which comprises:

providing, in correspondence with said switch element matrix, a two dimensional data array having a number of data elements corresponding to the number of said switch elements;

generating for each interval, first and second pseudo-random shuffle patterns, the respective shuffle patterns generated for each interval being the current shuffle patterns for the respective interval;

assigning a respective source to each of said data elements, the assigning of a respective source to each of said data elements being in accordance with said first current pseudo-random shuffle pattern;

assigning a respective destination to each of said data elements, the assigning of a respective destination to each of said data elements being in accordance with said second current pseudo-random shuffle pattern;

starting at one corner of said array, performing a testing of successively progressing diagonal regions across the array of the sources and destinations assigned to each array element to locate matches of bidding sources and destinations not previously allocated and successively allocating each match to the switch element corresponding to the respective data element; and after testing the complete array, operating the switch elements during a subsequent interval in accordance with the allocations made.

11. A process as set forth in claim 10 wherein each source maintains a message buffer having a respective queue for each destination and wherein each destination maintains an output buffer for each source and wherein each destination can disable waiting messages in the queue of a source for which the destination's respective output buffer has reached a preselected capacity.

12. A process as set forth in claim 10 wherein a source communicates bids to said process during a first one of said intervals; wherein said allocations occur during a second one of said intervals; wherein the allocation is communicated to the allocated sources and destinations are during a third one of said intervals; and wherein data transfer between correspondingly allocated sources and destinations occurs during a forth interval.

13. In a router for connecting, to a plurality of data destinations, a plurality of data sources bidding for connection to identified ones of said destinations, respective sets of connections being made during each of a succession of intervals using a matrix of crosspoint switch elements; a system for allocating the switch elements to possible connections which comprises:

for each source, a message buffer having a respective queue for each destination;

for each destination, an output buffer for each source;

a respective means associated with each destination for disabling waiting messages in the queue of a source for which the destination's respective output buffer has reached a preselected capacity;

means for providing, in correspondence with said switch element matrix, a data array having a number of data elements corresponding to the number of said switch elements;

assigning a respective source to each of said data elements;

assigning a respective destination to each of said data elements;

performing an incremental testing across the array, of the sources and destinations assigned to each array element to locate matches of bidding sources and destinations not previously allocated and successively allocating each match to the switch element corresponding to the respective data element; and after testing the complete array, operating the switch elements during a subsequent interval in accordance with the allocations made.

14. In a router for connecting, to a plurality of data destinations, a plurality of data sources bidding for connection to identified ones of said destinations, respective sets of connections being made during each of a succession of intervals using a matrix of crosspoint switch elements; a process for allocating the switch elements to possible connections which comprises:

- providing, in correspondence with said switch element matrix, a data array having a number of data elements corresponding to the number of said switch elements, said array being divisible into a plurality of regions corresponding to subgroupings of said data elements;
- generating for each interval, first and second pseudo-random shuffle patterns, the respective shuffle patterns generated for each interval being the current shuffle patterns for the respective interval;
- assigning, in accordance with said first current pseudo-random shuffle pattern, a respective source to each of said data elements;
- assigning, in accordance with said second current pseudo-random shuffle pattern, a respective destination to each of said data elements;
- starting at one corner of said array, performing a testing of successively progressing diagonal grouping of regions across the array of the sources and destinations assigned to each array region to locate matches of bidding sources and destinations not previously allocated and successively allocating each match to the switch element corresponding to the respective data element; and
- after testing the complete array, operating the switch elements during a subsequent interval in accordance with the allocations made.

15. A process as set forth in claim 14 wherein a source communicates bids to said process during a first one of said intervals; wherein said allocations occur during a second one of said intervals; wherein the allocation is communicated to the allocated sources and destinations are during a third one of said intervals; and wherein data transfer between correspondingly allocated sources and destinations occurs during a forth interval.

16. A process as set forth in claim 15 wherein each source maintains a message buffer having a queue for each destination and wherein said queues are at least three elements long so that it is possible for a source to transfer data cells during consecutive intervals.

* * * * *